H. W. Putney.
Grain Sieve.
N° 30,183.   Patented Sept. 25, 1860.
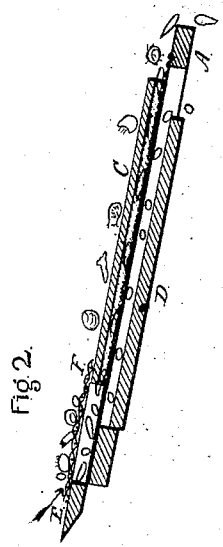
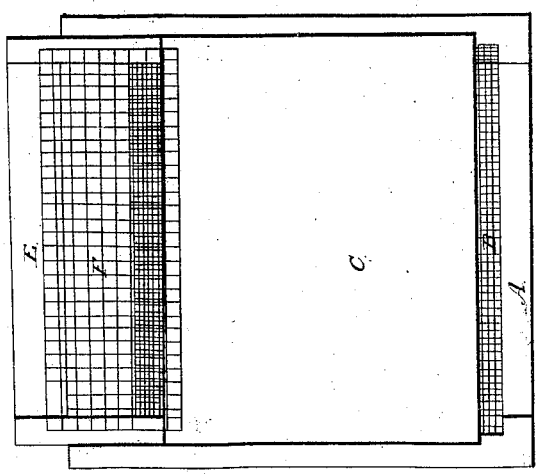
Witnesses:   Inventor:

UNITED STATES PATENT OFFICE.

HUBBARD W. PUTNEY, OF LYONS, NEW YORK, ASSIGNOR TO HIMSELF, AND CYRUS C. CRANE, OF PENN YAN, NEW YORK.

SIEVE FOR SEPARATING GRAIN, &c.

Specification of Letters Patent No. 30,183, dated September 25, 1860.

*To all whom it may concern:*

Be it known that I, HUBBARD W. PUTNEY, of Lyons, in the county of Wayne and State of New York, have invented a new and useful Improvement in Sieves; and I do hereby declare that the following is a full, clear, and exact description of the construction and operation of the same, reference being had to the annexed drawings, making a part of this specification, in which—

Figure 1, is a birdseye view. Fig. 2, is a longitudinal section of the same.

The letters of reference refer to the same parts in each figure.

A, is a rectangular frame of any size required. On the upper side the wire-gauze B is fastened in the ordinary manner. Above the gauze is the separating board C, and at the underside of the frame is the conducting board D. At the highest end the frame E is attached by means of screws or otherwise.

B, is the wire-gauze. The mesh is large enough to let wheat pass through it (when the sieve is used to separate oats from wheat) or of size to suit the grain or seed that is to be separated. It must be put on so that the surface will be uniform and even.

C, is the separating board. It is made to extend across the sieve and is secured to the upper side of the sieve frame at opposite edges. Its width must be such that it will nearly cover the gauze B. It must be raised above the gauze by means of strips of board the proper thickness being placed under each end, or by cutting away the board except at the ends, or it may be made adjustable, so as to allow it to be regulated to suit the size of any kind of grain or seed that are to be separated. It must be just high enough to let the wheat and oats pass under it and allow the wheat to pass down through the gauze and allow the oats to pass between the board and gauze and not allow the oats to rise perpendicular to the surface of the gauze, thus preventing the oats from getting through the gauze and thereby separate the oats and wheat.

D, is a conducting board, fastened to the under surface of the frame A. It must be so far below the gauze as to allow the wheat to pass freely on its surface. Its use is to prevent the oats from passing down through the gauze B and to conduct the wheat to the proper place to be acted upon by the wind or near the edge of another sieve that may be placed underneath it.

E, is the frame for the auxiliary sieve F. It is secured to the upper end of the frame A in such manner that it may be readily removed.

F, is an auxiliary sieve, with mesh large enough to let anything pass through it that will pass under the board C and thus prevent clogging by carrying all straws, bolls, or other large things to the upper side of the board C′ where it may pass off.

To use my invention, make the frame of the sieve the size to fit into the grooves of the shaker of a winnowing machine; then cause the grain to pass to the sieve in direction of the arrow Fig. 2.

The sieve operates faster if placed in an inclined position as represented by Fig. 2.

What I claim as new, and desire to secure by Letters Patent, is—

The arrangement of the distributing board C, the conducting board D and auxiliary sieve F when applied to the frame A and gauze B in the manner and for the purpose specified.

HUBBARD W. PUTNEY.

Witnesses:
R. H. MURDOCK,
SAXON B. GANTT.